US009503638B1

(12) United States Patent
Nguyen et al.

(10) Patent No.: US 9,503,638 B1
(45) Date of Patent: Nov. 22, 2016

(54) HIGH-RESOLUTION SINGLE-VIEWPOINT PANORAMIC CAMERA AND METHOD OF OBTAINING HIGH-RESOLUTION PANORAMIC IMAGES WITH A SINGLE VIEWPOINT

(71) Applicant: UtopiaCompression Corporation, Los Angeles, CA (US)

(72) Inventors: Hieu Nguyen, Cypress, CA (US); Sheng Liu, San Jose, CA (US); Joseph Yadegar, Los Angeles, CA (US)

(73) Assignee: UtopiaCompression Corporation, Los Angeles, CA (US)

( * ) Notice: Subject to any disclaimer, the term of this patent is extended or adjusted under 35 U.S.C. 154(b) by 321 days.

(21) Appl. No.: 14/171,134

(22) Filed: Feb. 3, 2014

Related U.S. Application Data

(60) Provisional application No. 61/849,782, filed on Feb. 4, 2013.

(51) Int. Cl.
*H04N 7/00* (2011.01)
*H04N 5/232* (2006.01)
*G06T 3/40* (2006.01)
*G02B 5/10* (2006.01)
*G02B 13/06* (2006.01)
*H04N 5/225* (2006.01)

(52) U.S. Cl.
CPC ............ *H04N 5/23238* (2013.01); *G02B 5/10* (2013.01); *G02B 13/06* (2013.01); *G06T 3/4038* (2013.01); *H04N 5/2254* (2013.01); *H04N 5/23212* (2013.01)

(58) Field of Classification Search
CPC .................. B01F 15/00487; B01F 7/00416; B22F 2003/1056; B22F 2003/1058; B22F 3/1055; B29B 7/489; B29C 47/08; B29C 47/402; B29C 47/60; B33Y 10/00; B33Y 80/00; Y02P 10/295
USPC ......................................................... 348/36
See application file for complete search history.

(56) References Cited

U.S. PATENT DOCUMENTS 6,141,034 A   10/2000   McCutchen
6,195,204 B1   2/2001   Nalwa
(Continued)

OTHER PUBLICATIONS

Basu, A., Licardie, S., "Alternative models for fish-eye lenses", N.H. Elsevier Science B.V., Apr. 1995.
(Continued)

*Primary Examiner* — Shan Elahi
(74) *Attorney, Agent, or Firm* — Barlow, Josephs & Holmes, Ltd.

(57) ABSTRACT

The present invention provides a method and apparatus of obtaining single and video, high-resolution, panoramic images of a large field-of-view scene with a single viewpoint. The system consists of a segmented cap lens, multiple imaging sensors and imaging lenses. The cap lens is segmented to capture an individual sub-field of the entire panorama. In addition, the cap lens is optimized to relay the optical centers of the component cameras into a single viewpoint therefore reducing parallax errors. A high-resolution panoramic image with reduced artifacts is reconstructed by mosaicking multiple images taken by component cameras. The entire system is based upon refractive lenses to minimize the path length of light rays, enabling a relatively compact design for practical applications.

20 Claims, 11 Drawing Sheets

(56) References Cited

U.S. PATENT DOCUMENTS

| | | |
|---|---|---|
| 6,809,887 B1 | 10/2004 | Gao et al. |
| 7,006,123 B2 | 2/2006 | Yoshikawa et al. |
| 8,462,195 B2 | 6/2013 | Yeh et al. |
| 8,482,595 B2 | 7/2013 | Kweon |
| 2002/0181115 A1* | 12/2002 | Massof ................ G02B 27/017 359/630 |
| 2003/0026588 A1* | 2/2003 | Elder ............... G08B 13/19643 386/230 |
| 2003/0081949 A1* | 5/2003 | Tsai .......................... G02B 7/04 396/144 |
| 2005/0025313 A1* | 2/2005 | Wachtel ................ G06T 1/0007 380/54 |
| 2005/0141089 A1* | 6/2005 | Grover ................... G02B 13/06 359/462 |
| 2006/0227417 A1* | 10/2006 | Grover ............... G02B 27/2242 359/462 |
| 2008/0192344 A1* | 8/2008 | Grover ................... G02B 13/06 359/462 |
| 2009/0010638 A1* | 1/2009 | Chao ........................ G02B 7/02 396/448 |
| 2009/0034086 A1* | 2/2009 | Montgomery ......... G03B 35/10 359/629 |
| 2011/0242272 A1* | 10/2011 | Tabor ....................... G02B 6/06 348/36 |
| 2012/0235884 A1* | 9/2012 | Miller ................ G02B 27/0093 345/8 |

OTHER PUBLICATIONS

Nayar, S., "Catadioptric Omnidirectional Camera", IEEE 1997.

* cited by examiner

OPTIMIZATION OF THE IMAGING LENS GROUP TOGETHER WITH THE PLANO-CONCAVE MENISCUS, IN THE (a) IMAGE SPACE AND (b) PUPIL SPACE (a) MTF AND (b) FIELD CURVES OF THE OPTIMIZED IMAGING LENS GROUP OF THE PANORAMIC IMAGING CAMERA

HIGH-RESOLUTION SINGLE-VIEWPOINT PANORAMIC CAMERA AND METHOD OF OBTAINING HIGH-RESOLUTION PANORAMIC IMAGES WITH A SINGLE VIEWPOINT

CROSS-REFERENCE TO RELATED APPLICATIONS

This application is related to and claims priority from earlier filed U.S. Provisional Patent Application No. 61/849,782, filed Feb. 4, 2013.

GOVERNMENT LICENSE RIGHTS

This invention was made with government support under contract number W91CRB-11-C-0008 awarded by DARPA. The government has certain rights in the invention.

BACKGROUND OF THE INVENTION

The present invention relates generally to panoramic imaging systems. More specifically, the present invention relates to a method and system for obtaining single and video, high-resolution, images of a panorama with a single viewpoint.

Large field-of-view (FOV) high resolution imaging systems have been a classical challenge for optical system design and engineering for decades. With a modern trend towards rapidly shirking pixel size and the rapidly growing number of pixels that are being packaged onto a single sensor, there have been enduring interests in both academia and industry for development of large FOV high resolution imaging systems. To address these needs the panoramic camera has recently risen as one of the top candidate technologies because of the increased FOV coverage and improved spatial resolution that they provide. However, while panoramic cameras provide advantages, they are rarely found in daily usage and practical applications because they are generally much more expensive and bulky than a conventional camera.

In addition to the practicality concerns, panoramic cameras suffer a number of design issues that inhibit their wide adoption for demanding imaging applications. Among one of those problems is the parallax error. A majority of panoramic cameras are unable to produce a seamless panoramic image because the viewing center of the system varies with the viewing directions. Secondly, serious imaging artifacts are commonly found in some panoramic cameras making them appear as if they had been imaged through a fisheye lens. Typically, those images are notoriously skewed, distorted and in certain cases, blurred towards the edge of the field. These artifacts get even worse as the FOV increases. All these issues have led to the degradation of optical quality and fidelity of panoramic images and, as a result, have limited the widespread application of panoramic cameras.

Past research efforts on panoramic cameras have been focused on resolving the above noted issues related to increasing FOV coverage, improving image resolution, reducing parallax errors and minimizing imaging artifacts. Although a lot of panoramic cameras have been proposed and developed in the literature, very few of them have achieved the same goal of devising a large FOV, high resolution, single viewpoint and minimization of artifacts using a relatively small form factor and practical package. A commonly adopted approach to large FOV high resolution panoramic imaging is to simply assemble a cluster of cameras each with smaller FOV and to direct each unit to a specified viewing angle, collecting a small portion of the entire scene. The multiple component images are then fused to achieve a large FOV panorama. A common problem associated with this approach is induced parallax errors. Since each component camera specifies a distinct viewpoint that is different from each of the others, the system is not of a single viewpoint. As a result a noticeable gap may arise near the boundary of two component images of the fused panoramic image.

A modification to this approach is to arrange camera arrays in a fashion that viewpoints of all component cameras are brought together, merging into a single viewpoint and leading to reduced parallax errors. In this approach, segmented mirrors are commonly used with each camera facing one segment of the mirror surface, the physical view centers of all component cameras are relayed into a common virtual view center, turning the camera cluster into a panoramic imaging system with a single viewpoint. The challenge associated with the mirror-based camera cluster method is that the mirror surface has to be carefully segmented without causing physical interference to either component cameras or blocking the view. Bending of light off the mirror surface also leads to increased system size, therefore resulting in a relatively bulkier and heavier system than a conventional single-sensor single lens camera.

Alternately, a curved mirror together with a single image sensor has been employed to create a so-named omnidirectional panoramic camera. In order to guarantee single viewpoint condition, the mirror is engineered mostly as a continuous surface with a specified shape and curvature. The incoming light is reflected off the mirror surface and redirected to a single viewpoint physically existing in space. An imaging camera is positioned at the viewpoint to capture the entire panorama at one shot. This approach, compared to a camera cluster, is simpler and less expensive. It requires only one camera instead of multiple image sensors. However, it suffers disadvantages similar to those of the fisheye lens approach, such as large distortion, low image resolution, as well as obscuration induced by the curved mirror. In general, most single sensor panoramic cameras suffer low imaging resolutions. Therefore, the present method and apparatus of the invention are most analogous to the camera cluster approach, whereas with capability of single viewpoint imaging and much reduced artifacts.

There is therefore a need for a method and apparatus for achieving single and video high resolution panoramic imaging over a hemispheric, spherical or near spherical FOV with a single viewpoint and reduced parallax errors.

BRIEF SUMMARY OF THE INVENTION

In this regard, the present invention provides a method and apparatus of achieving single and video high resolution panoramic imaging over a hemispherical, spherical or near-spherical FOV with a single viewpoint and reduced parallax errors.

The system comprises a cluster of conventional cameras and a novel segmented cap lens that relays a single viewpoint of a panorama to a plurality of relayed viewpoints. At each of the relayed viewpoints, a camera is positioned to capture that segmented sub-portion of the panoramic image. As a result, the entire hemisphere of view (FOV) is covered, and furthermore, images taken by the individual cameras appear as if they were taken from a common viewpoint. All pictures taken by the component cameras share a common viewpoint, which also makes stitching individual images into a panorama much simpler, more robust and computationally efficient than other multi-camera systems where component cameras have different viewpoints.

In addition, segmentation using the refractive-type cap lens of the present invention enables seamless fusion of a panorama from each individual image, without causing gaps and artifacts at the boundaries of two component images. The incoming light in sequence passes through the cap lens, is refocused by the imaging lens and is finally collected by the image sensor without significant divergence from its original propagation direction. The advantage of this design, which is completely dioptric, is that the optical components are relatively simple so that the entire system is much smaller in size compared to a catadioptric panoramic camera which consists of both lenses and multi-faceted mirrors. Since each component camera captures only a small portion of the entire FOV, the system possesses advantages of a camera cluster based panoramic camera, with potentially high resolution and minimal image distortion, skew and blur.

In an alternate embodiment, the cap lens is changed in shape and optical power. The imaging rays passing through the cap lens are converged towards the imaging lens where a physical viewpoint is located. The imaging lens similarly refocuses the incoming rays onto the component image sensor. This arrangement enables panoramic imaging with a spherical FOV while retaining all the advantages of the earlier embodiment, such as single viewpoint, uniformly high resolution and minimal imaging artifacts. The compromise however is that since the image sensor and imaging lens have to be enclosed inside the cap lens, an increase is required in the overall size of the cap lens and of the body of panoramic camera.

It is therefore an object of the present invention to provide a cap lens assembly that enables single viewpoint capability for a panoramic camera. It is a further object to provide a lens that has 360-degree rotational symmetry around a center where the single viewpoint of a panoramic camera is identified. It is still a further object of the present invention to provide a lens assembly that is a refractive optical element with either positive or negative optical powers to relay an intangible single viewpoint into multiple divided viewpoints where component cameras can be located wherein the lens is segmented into sub portions with each specific to one component camera. As a result, the panoramic FOV is mosaicked into multiple smaller sub-fields, thus increasing the image resolution of the reconstructed panorama.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated exemplary embodiments of the invention.

BRIEF DESCRIPTION OF THE DRAWINGS

In the drawings which illustrate the best mode presently contemplated for carrying out the present invention.

DETAILED DESCRIPTION OF AN EXEMPLARY EMBODIMENT

Figure 1:
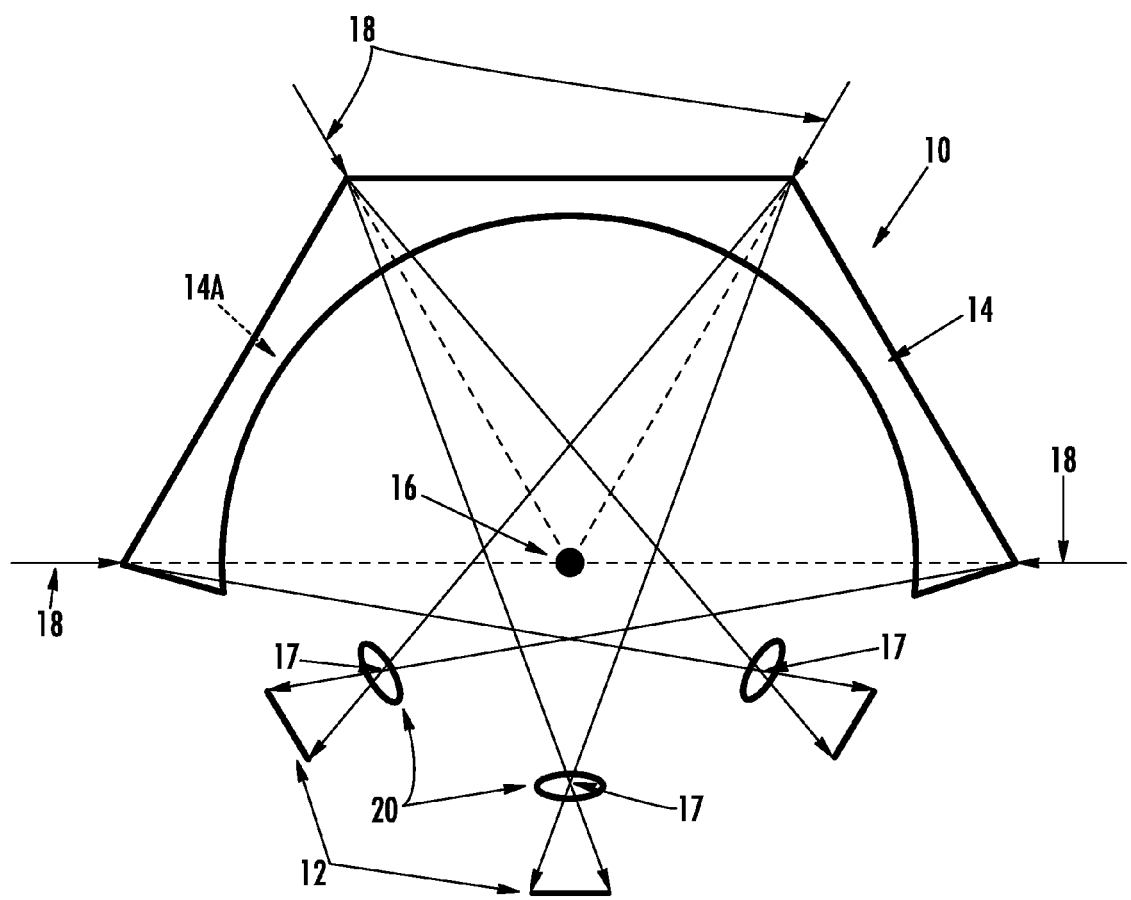
FIG. 1 shows schematic diagram of an exemplary embodiment of a panoramic camera in accordance with the present invention.

Now referring to the drawings, a method and apparatus of achieving single and video high-resolution panoramic imaging over hemispherical, near-spherical or spherical fields of view (FOV) with a single viewpoint and reduced parallax errors is shown and illustrated. As is generally shown at FIG. 1, the system 10 comprises a cluster of conventional cameras 12 and a novel segmented cap lens 14 that relays a single viewpoint 16 into a plurality of relayed viewpoints 17. At each of the relayed viewpoints 17, a camera 12 is positioned to capture that segmented sub-portion of the panoramic image. As a result, the entire hemisphere of view is covered, and furthermore, images taken by individual cameras 12 appear as if they were taken from the single common viewpoint 16. All pictures taken by the component cameras 12 share a common single viewpoint, which also makes stitching individual images into a panorama much simpler, more robust and computationally efficient than other multi-camera systems where component cameras have different viewpoints.

It should be appreciated that while the figures depict the lens 14 as being monolithic, each of the facets of the lens 14A could be formed as a singular lens and then a plurality of lenses 14A may be assembled to form the cap lens 14.

In addition, segmentation using the refractive-type cap lens of the present invention enables seamless fusion of a panorama from each individual image, without causing gaps and artifacts at the boundaries of two component images. The incoming light rays 18, in sequence, pass through the cap lens 14, are refocused by the imaging lens 20 and are finally collected by the image sensor (camera) 12 without significant bending of direction. The advantage of this design, which is completely dioptric, is that the optical components are relatively simple so that the entire system is much smaller in size compared to a catadioptric panoramic camera which consists of both lenses and multi-faceted mirrors. Since each component camera 12 captures only a small portion of the entire FOV, the system possesses advantages of a camera cluster based panoramic camera, with potentially high-resolution and minimal image distortion, skew and blur.

Figure 2:
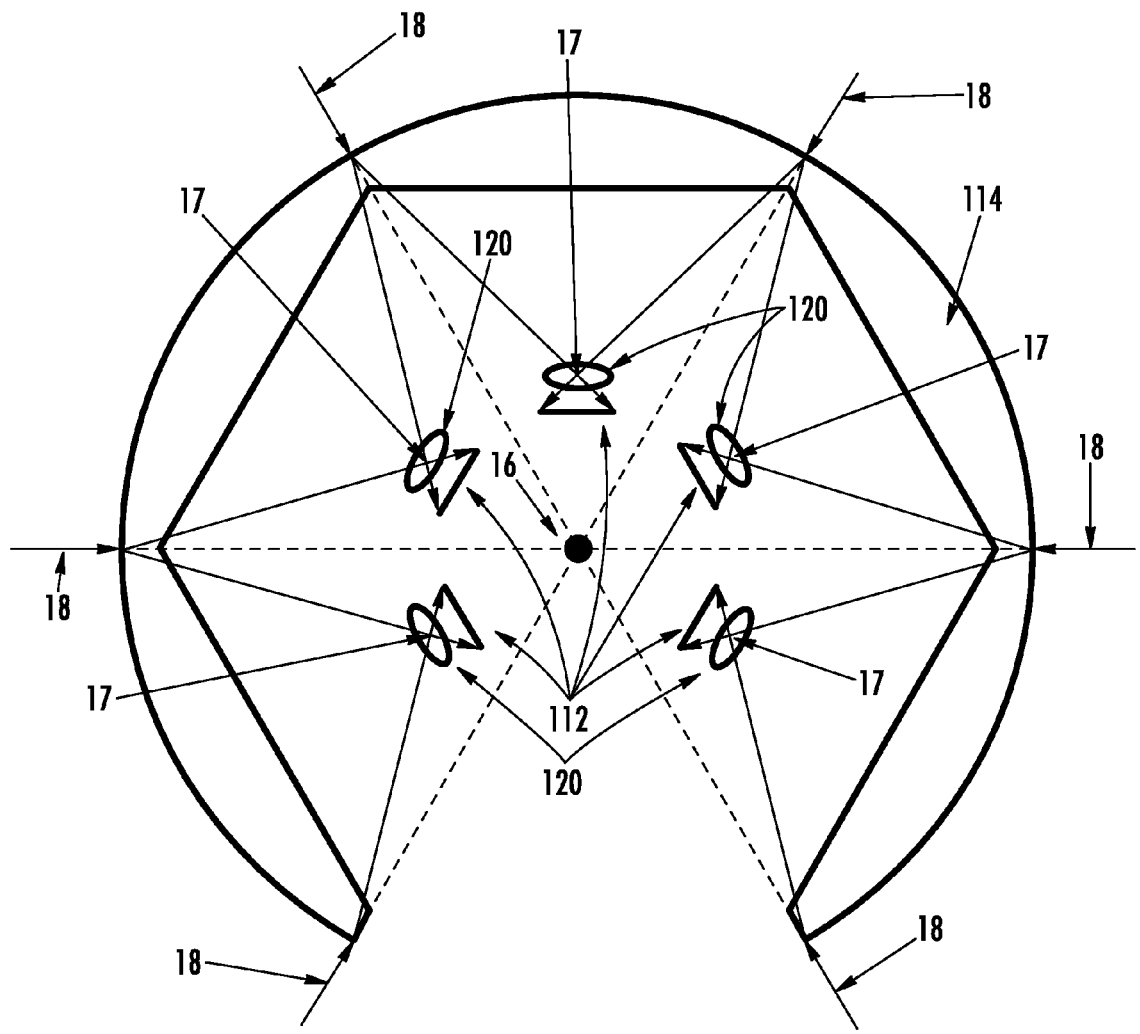
FIG. 2 shows schematic diagram of an alternate exemplary embodiment of a panoramic camera in accordance with the present invention.

In an alternate embodiment, depicted at FIG. 2, the cap lens 114 is changed in shape and optical power. The imaging rays 18 passing through the cap lens 114 are converged towards the imaging lenses 120 where a physical viewpoint 16 is located. The imaging lenses 120 similarly refocus the incoming rays 18 onto the component image sensors 112. This arrangement enables panoramic imaging with a spherical, or near spherical, FOV while retaining all the advantages of the earlier embodiment, such as single viewpoint, uniformly high resolution and minimal imaging artifacts. The compromise however is that since the image sensor and imaging lens have to be enclosed inside the cap lens, an increase is required in the overall size of the cap lens and of the body of panoramic camera.

At FIGS. 3a-d the optical concept of the present invention is compared to the operation of a traditional fisheye lens.

Figure 3A:
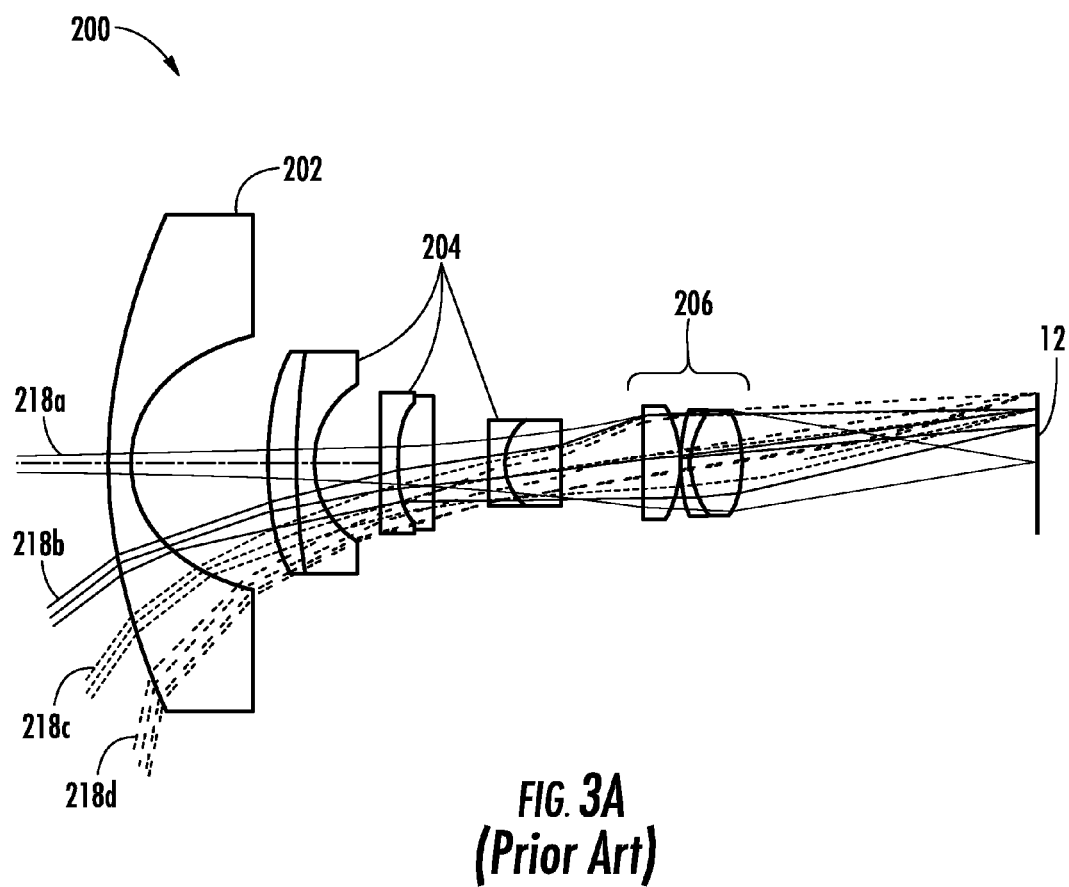
FIG. 3a shows the optical layout of a conventional fisheye lens camera.

Starting with FIG. 3(a), the optical layout of a conventional fisheye lens is shown at 200. From left to right, the fisheye lens starts with a negative meniscus 202, is then followed by a few doublets 204 and lens groups 206 and then the image sensor 12. The negative meniscus 202 firstly slows down the chief ray 18a-d, and the following lenses 204, 206 further slow the chief ray 18 angles, correct the residue image aberration, and form an image on the image sensor 212 which is typically highly distorted. Since the negative meniscus 202 captures the chief rays 18a-d across the entire hemispherical FOV, it is practically very challenging to minimize the image aberration while maintaining low image distortion at the same time.

Figure 3B:
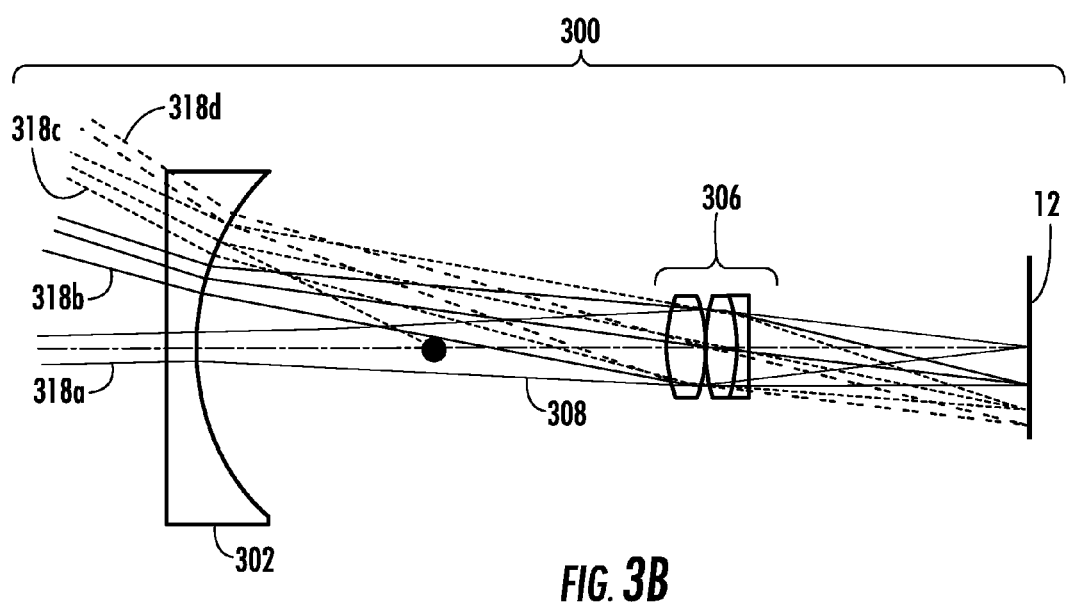
FIG. 3b shows the optical layout of a sub-section of the present panoramic imaging camera.
Figure 3C:
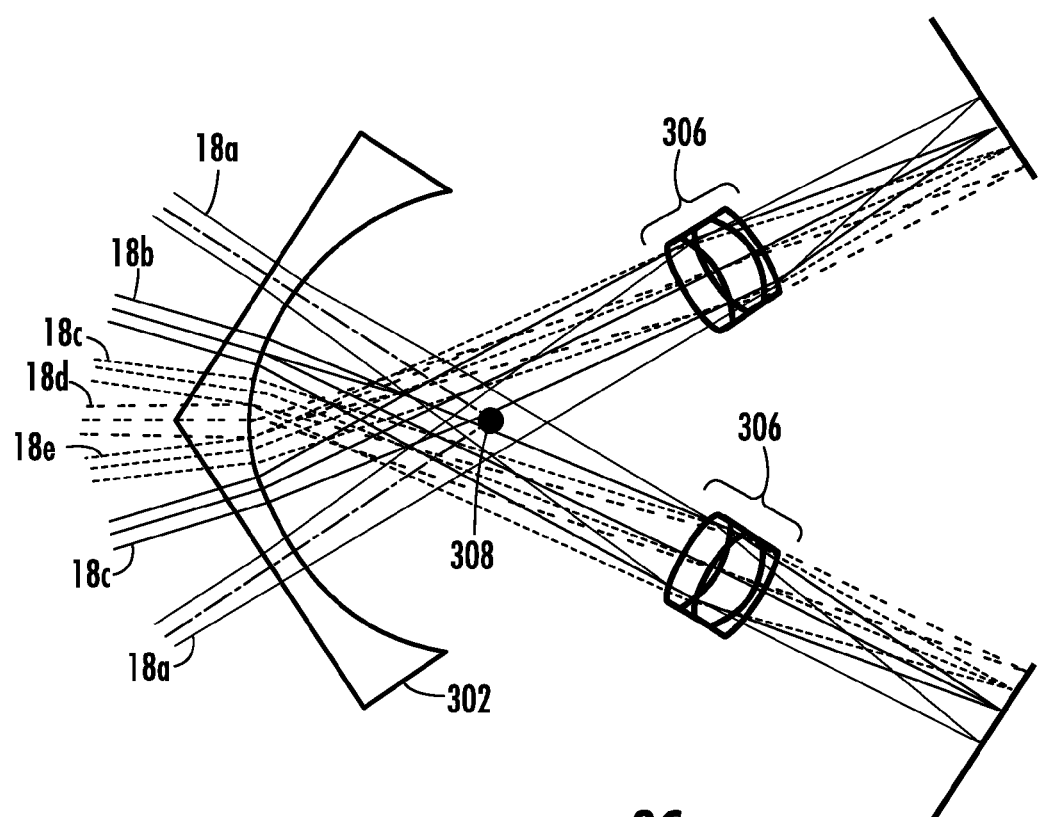
FIG. 3c shows the optical tiling of two sub-sections of the system of the present invention.
Figure 3D:
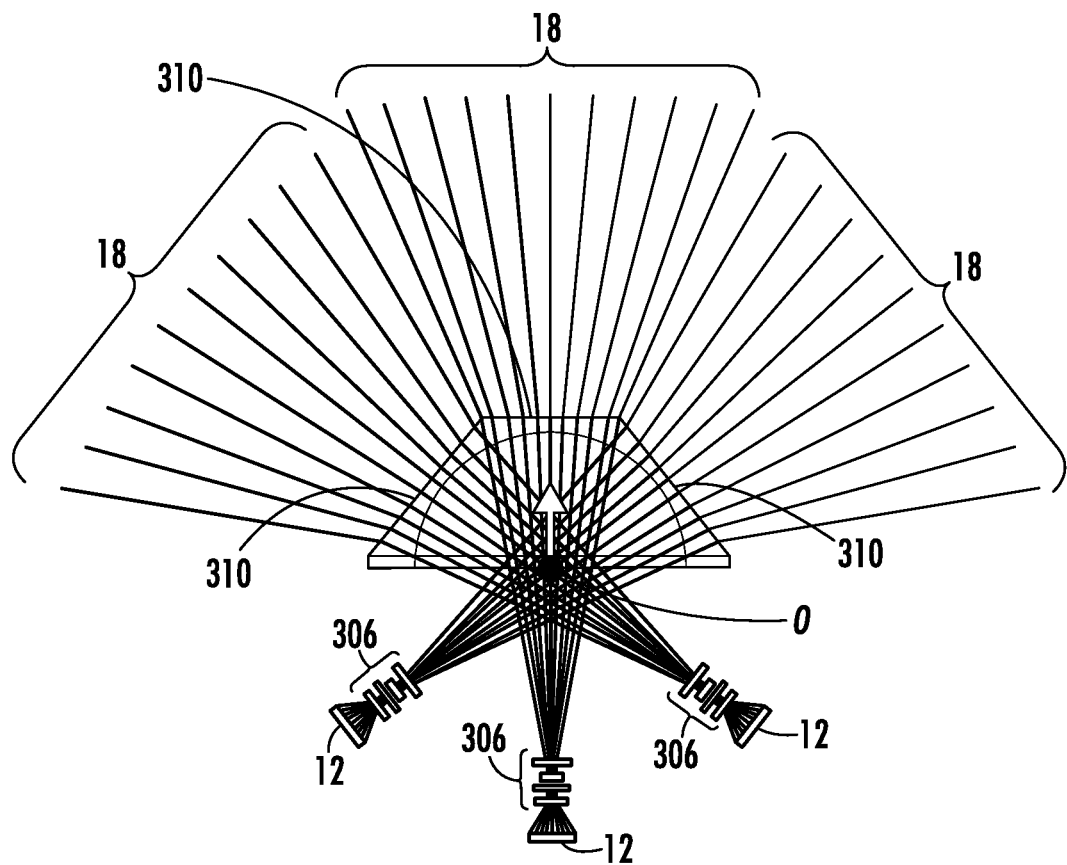
FIG. 3d shows a model of the panoramic imaging camera of the present invention with only the chief incoming light rays shown.

FIG. 3(b), shows one segment 300 of the camera system of the present invention. The lens in this system also starts with a negative meniscus 302 from its left side. In this case however, the meniscus 302 only captures a segmented sub-portion of the panoramic hemisphere view. To the far right of the meniscus 302, a lens group 306 is placed near the relayed position of the entrance pupil 308, which forms the actual stop of the imaging optics. This lens group 306 provides the focusing power and corrects the residue image aberrations. Thus, the optical layout in FIG. 3(b) is a subsection of the panoramic imaging optics which captures only a small portion of the hemispherical FOV.

Next in FIG. 3 (c), two similar lens groups 306 as in FIG. 3 (b) are spatially tiled together by rotating them around their entrance pupil 308 location, which is illustrated by a black dot. As a result, with this combination, the total FOV is doubled without sacrificing the image quality or increasing the image distortion, while maintaining the single viewpoint attribute.

Further tiling more lens groups 300 together, the front negative meniscus transforms to a pyramid-shaped lens 302 as shown in FIG. 3 (d), with multiple flat surfaces 310 facing the scenes to be captured and with a single spherical concave surface 312 facing a cluster of imaging lenses 306 and image sensors 12. The design of the camera system of the present invention is therefore referred to as a pyramid fisheye lens method. Note in FIG. 3 (d), only chief rays 18 are shown to demonstrate the angular tiling of multiple meniscus 302, imaging lens 306, and image sensor 12 groups for the increased FOV with a single viewpoint, where the viewpoint is located at the center of curvature of the spherical concave surface 312 or at the origin O of the (x,y,z) coordinate.

Figure 4A:
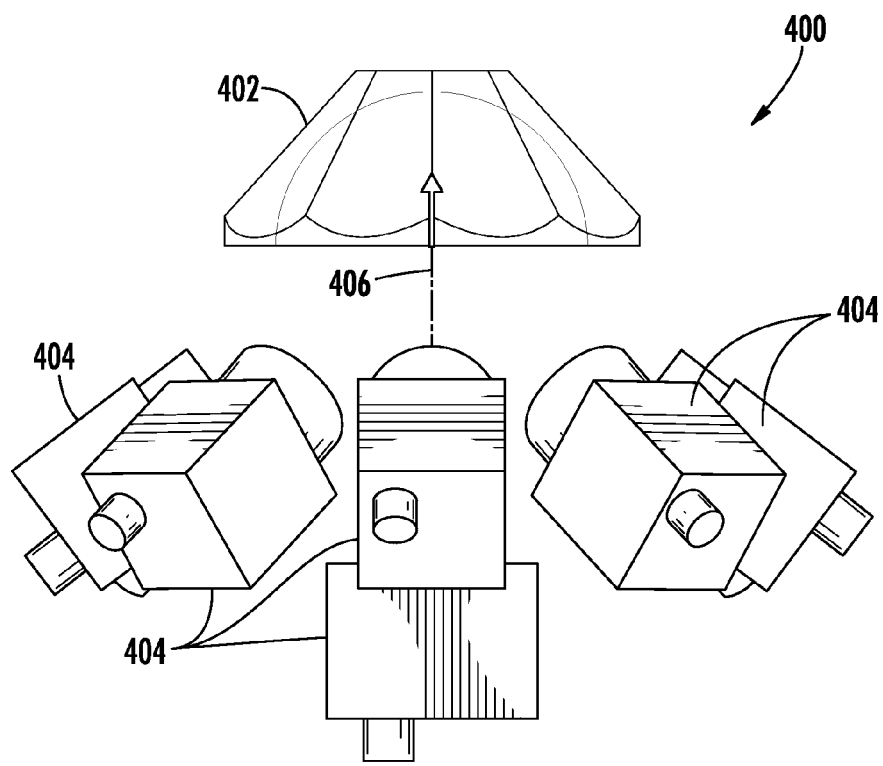
FIGS. 4a-b show front and top views of an exemplary embodiment of a panoramic camera system in accordance with the present invention.
Figure 4B:
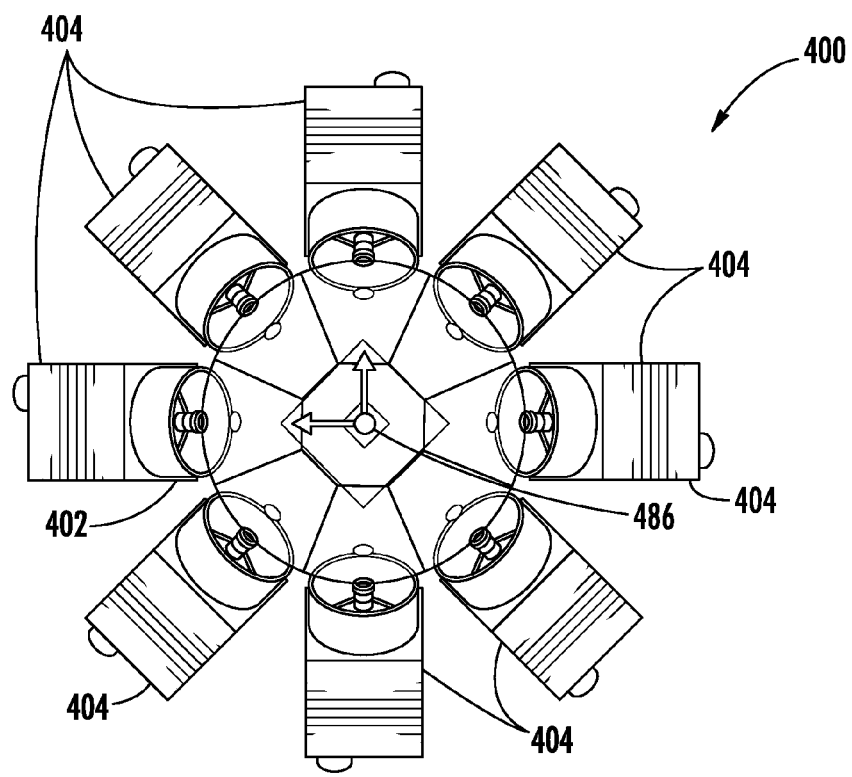

It should be appreciated that while the geometry depicted at FIGS. 3a-d is planar, the viewpoint can be shifted in the z axis relative to the lens arrangement. FIGS. 4a and 4b show a 3D model of a configuration of the proposed panoramic camera generally at 400, which includes the pyramid lens 402 and a cluster of nine (9) individual component cameras 404. The 3-D model shows no hardware interference by spatially tiling multiple cameras 404 pointing through the same viewpoint 406.

In order to guarantee that multiple negative meniscus lenses 302 can be tiled as a seamless singlet, the negative meniscus 304 as shown in FIG. 3b (which is called the cap lens) is designed to meet the following conditions: (1) the image side of the lens is flat while the sensor side is spherically concave with a radius of curvature of R; and (2) R equals the distance, d, from the entrance pupil 308 location to the vertex of the spherical concave surface. In addition, the distance from the imaging lens group 306 to the entrance pupil 308 can be reasonably large to prevent the hardware interference through spatial tiling. Furthermore, the cap lens 302 and the imaging lenses 306 can be jointly optimized to minimize the parallax errors of all chief rays 18a-d at the entrance pupil 308 location so as to achieve the single viewpoint of the entire camera system 300.

Figure 5A:
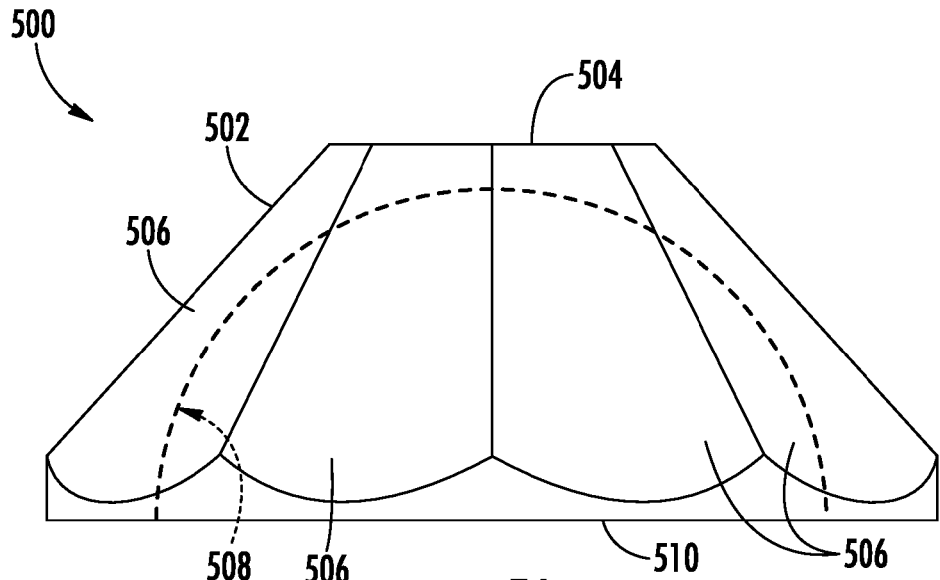
FIGS. 5a-b show front and top views of a segmented cap lens for one embodiment of the panoramic camera.
Figure 5B:
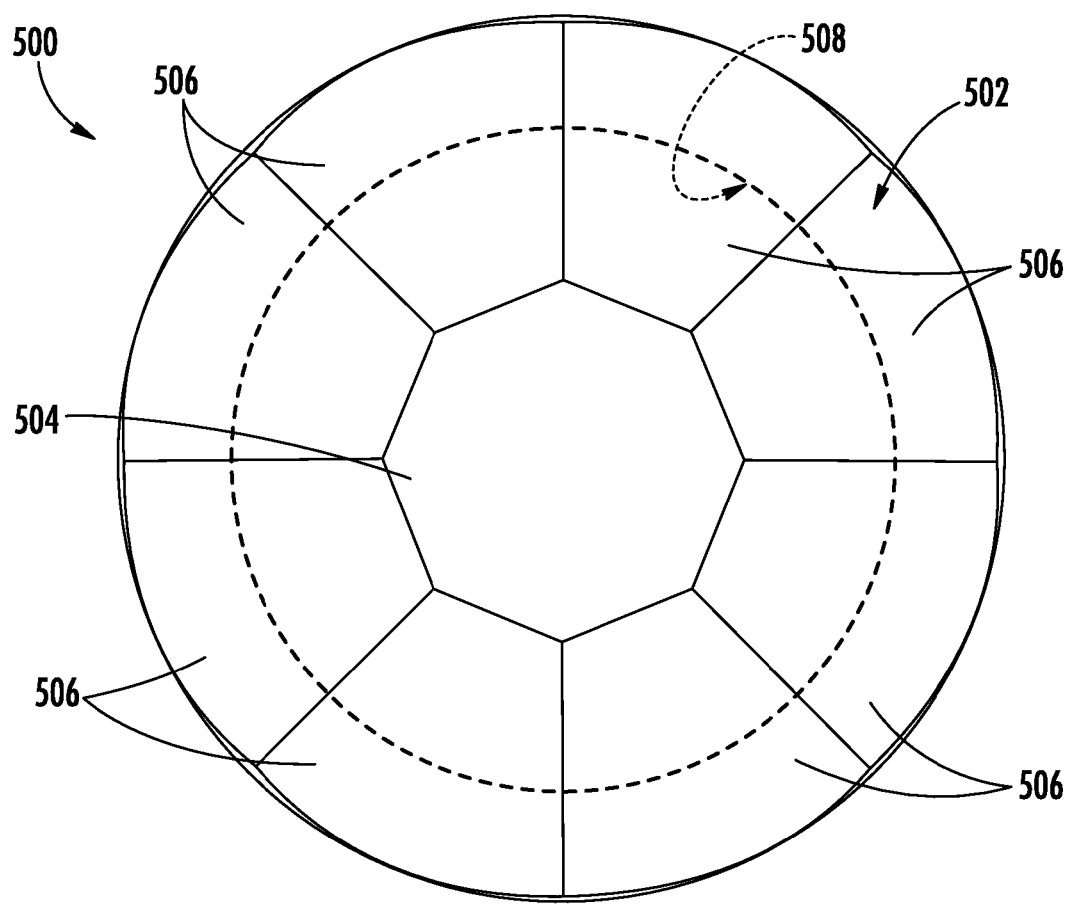
Figure 6:
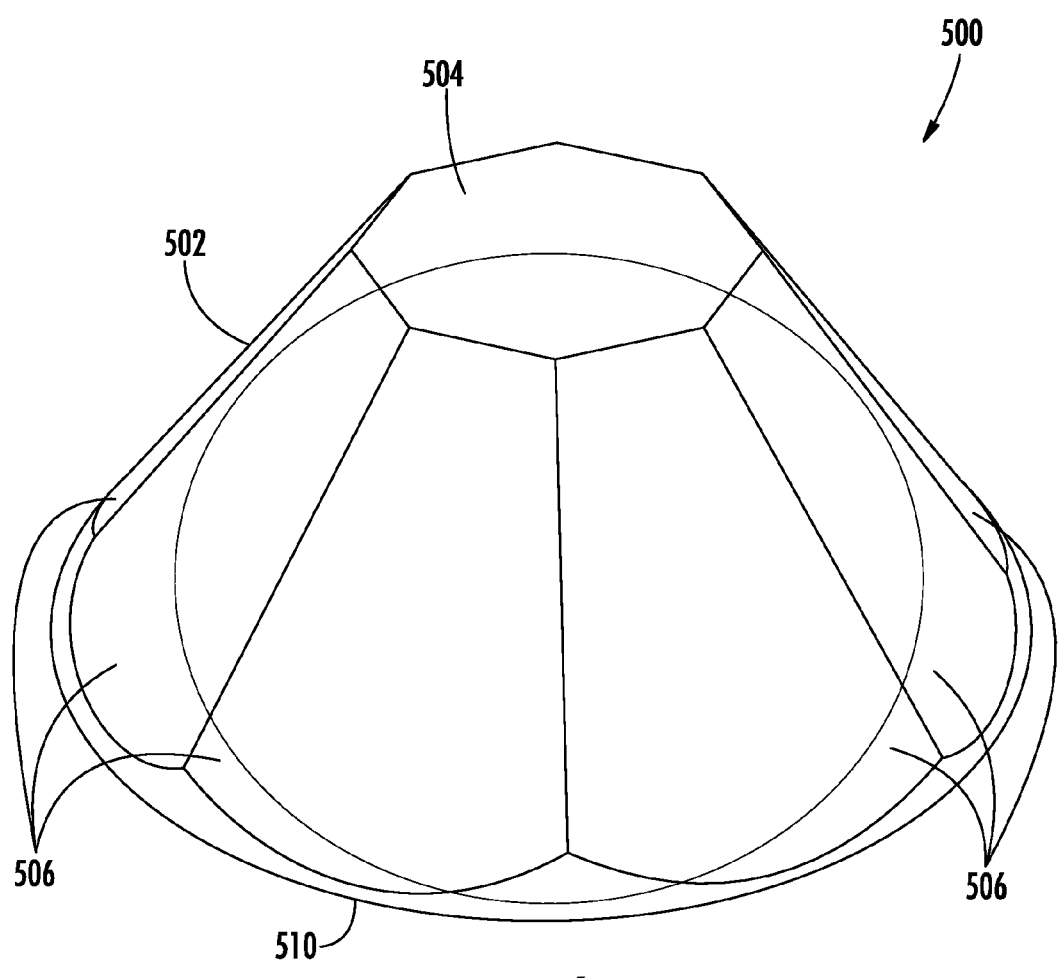
FIG. 6 shows a perspective view of a segmented cap lens for one embodiment of the panoramic camera.

FIG. 5 shows an example design of the cap lens generally at 500. The lens 500 has the shape of a truncated pyramid. The outer side 502 of the lens 500 is divided into flat surfaces 504, 506 facing the scenes to be captured, one flat surface (center surface) 504 facing up directly to the center sub-field and the remaining flat surfaces (side surfaces) 506 facing to the side sub-fields. The inner side 508 of the pyramid lens 500 is a spherical concave surface with its center of curvature, defined at the center of the bottom side 510 of the lens 500. The geometry of the cap lens 500 can be optimized together with the imaging lens groups 306 at the component cameras 12 to achieve the optimal image quality. A perspective view of an exemplary cap lens 500 is shown in FIG. 6.

Figure 7:
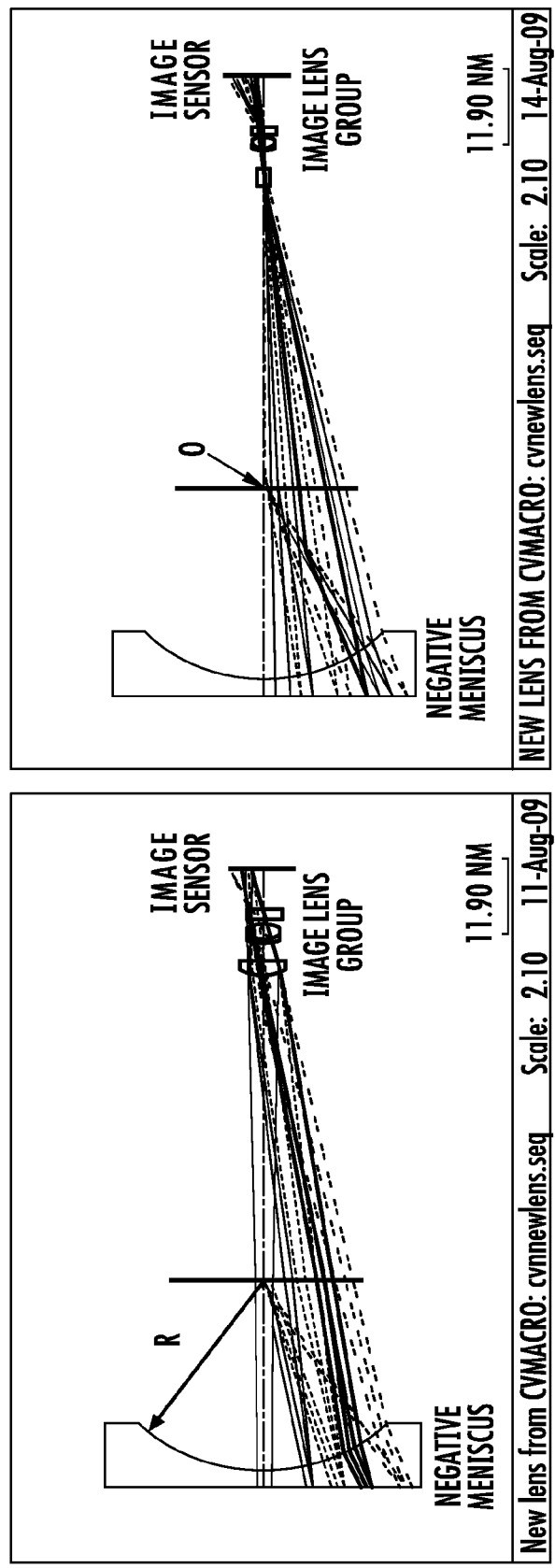
FIG. 7 depicts optimization of the imaging lens group together with the plano-concave meniscus, in the (a) image space and (b) pupil space.
Figure 8:
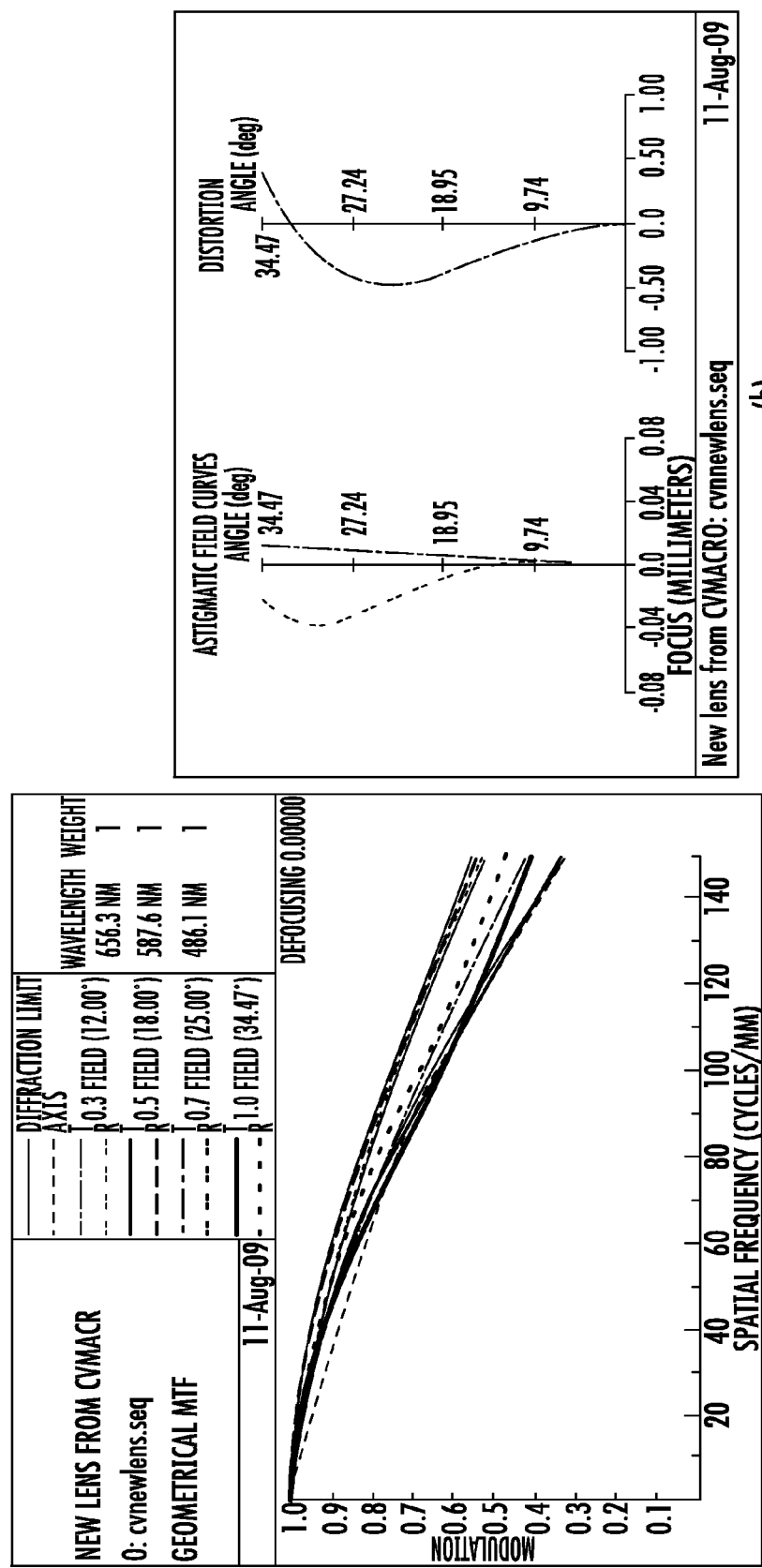
FIG. 8 shows optical performance of optimized cap lens together with imaging lens (a) MTF curves and (b) field curvature and distortion curves.

An optimized imaging lens group together with the plano-concave meniscus and the image sensor is shown in FIG. 7. In the image space (a), the imaging lens group defines the system stop location, and the imaging optics are optimized with the entrance pupil located at the center of curvature of the spherical concave surface. Relaying from a single viewpoint (O) to the system stop is further visualized in the pupil space layout in (b), in which the chief light ray bundle converges at both entrance pupil location and stop location. Other attributes of the imaging lens group are further illustrated, such as the MTF curves better than 0.3 for spatial frequencies up to 150 lp/mm as shown in FIG. 8 (a), the field curves showing low distortions less than 0.5% in FIG. 8 (b).

To form the panoramic image, stitching is performed using 2D homography mapping between the camera views. It is known in computer vision that if the camera motion between two images is pure rotation, with no translation, the two images are related by a projective linear mapping called homography:

$$m_2 \propto H m_1$$

where $m_1=(x_1,y_1,1)$ and $m_2=(x_2,y_2,1)$ are the projective image coordinates in the two images of the same 3D point, $\propto$ denotes equality up to a scale factor, and H is the 3×3 homography matrix that depends on the camera rotation and its intrinsic parameters. In our camera design, after the light refraction by the cap lens, all the nine (9) cameras have the same effective viewpoint. Therefore, the images of any two cameras can be considered as created by the same camera under a rotation, and hence, the equation will hold. The knowledge of the inter-camera homographies then allows us to project all nine (9) images to a common view (single viewpoint) to form a panoramic picture of the scene. The inter-camera homographies depend only on the relative position and orientation between the component cameras and are calculated during the calibration phase.

As a result, the single viewpoint capability of the invented panoramic camera system is achieved by a refractive method (lens-based) as opposed to the existing reflective method (mirror-based). The advantage of this approach is that it potentially can deliver a significantly smaller system form factor, and the lens is also relatively easier to fabricate. In the mirror-based approach, the mirror pyramid has to be hollow at the center with a wedged surface and hence is difficult to manufacture. Furthermore, due to the reflection off the mirror and the size limitation of the camera, a mirror pyramid design could potentially be very large. Further, compared to hemispherical fisheye cameras that use a single image sensor, our approach can achieve much higher resolution as the hemisphere FOV is divided into multiple sub-fields each of which is captured by a single camera. Moreover, the resulting panoramic image has better quality in terms of uniform resolution everywhere and absence of distortion or skew.

The camera system is potentially useful for numerous real-world applications. The first application domain is wide-area video surveillance where our approach can significantly enhance the imaging resolution and produce seamless panorama with minimal parallax errors. With the potential compactness and low weight, the camera can be used on aerial platforms to acquire high-quality imagery of a large area on the ground, or on military vehicles to provide the operator a high-fidelity panoramic picture of the surrounding environmental conditions. The invented camera can also be useful in video conferencing applications where each participant is able to see all other participants at a remote location.

It can therefore be seen that the present invention provides a lens assembly that enables single viewpoint capability of a panoramic camera. Further provided is a lens that has 360-degree rotational symmetry around a center where the single viewpoint of a panoramic camera is identified. Still further the present invention provides a lens assembly that is a refractive optical element with either positive or negative optical powers to relay a single viewpoint into multiple divided viewpoints (relayed viewpoints) where individual component cameras can be located, the lens being segmented into sub portions with each segment specific to one component camera. As result, the panoramic FOV is mosaicked into multiple smaller sub-fields increasing the image resolution of the reconstructed panorama. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An apparatus for capturing a panoramic image comprising:
a lens having a plurality of lens facets, each lens facet having a flat surface and a spherical opposing surface, wherein each lens facet is arranged to relay a single viewpoint of a panorama into a plurality of distinct relayed viewpoints; and
a plurality of image detectors each respectively positioned at one of said plurality of relayed viewpoints to capture an image at each of said relayed viewpoints;
whereby the images from each of said image detectors are collected and stitched together to form a single panoramic image having a single viewpoint.

2. The apparatus of claim 1, wherein a field of view of said panoramic image is divided into a plurality of subfields wherein each subfield is imaged by one of said lens facets.

3. The apparatus of claim 1, further comprising:
a plurality of imaging lenses, each corresponding to one of said lens facets, positioned to capture a corresponding segment of said panoramic image and refocus it onto said corresponding image detector.

4. The apparatus of claim 1, wherein said lens is formed monolithically.

5. The apparatus of claim 1, wherein each of said lens facets is a single lens.

6. The apparatus of claim 1, wherein said flat surface is on the image side of the lens and said spherical surface is concave and on the image capture side of the lens.

7. The apparatus of claim 6, wherein each of said facets is positioned such that the radius of curvature of said spherical surface is positioned at the center of a bottom surface of said lens.

8. The apparatus of claim 1, wherein said flat surface is on the image capture side of the lens and said spherical surface is on the image side of the lens.

9. The apparatus of claim 1, wherein the spherical surface has a radius of curvature that is equal to a distance from the entrance pupil location to a vertex of the spherical surface.

10. The apparatus of claim 1, wherein each of said facets is angled relative to a z axis such that the single viewpoint is positioned at a bottom surface of said lens.

11. The apparatus of claim 10, further comprising a top facet positioned at a top edge of said plurality of lens facets, said top facet also directing an image segment to said single viewpoint.

12. The apparatus of claim 10, wherein an outer surface of said system forms a truncated pyramid.

13. The apparatus of claim 1, further comprising a top facet positioned at a top edge of said plurality of lens facets, said top facet also directing an image segment to said single viewpoint.

14. An apparatus for capturing a panoramic image comprising:
a lens having a plurality of lens facets, each lens facet having a flat surface and a spherical opposing surface, wherein each lens facet is arranged to relay a single viewpoint of a panorama into a plurality of distinct relayed viewpoints.

15. The apparatus of claim 14, wherein said flat surface is on the image side of the lens and said spherical surface is concave and on the image capture side of the lens.

16. The apparatus of claim 15, wherein each of said facets is positioned such that the radius of curvature of said spherical surface is positioned at the center of a bottom surface of said lens.

17. The apparatus of claim 14, wherein said flat surface is on the image capture side of the lens and said spherical surface is on the image side of the lens.

18. The apparatus of claim 14, wherein the spherical surface has a radius of curvature that is equal to a distance from the entrance pupil location to a vertex of the spherical surface.

19. The apparatus of claim 14, wherein each of said facets is angled relative to a z axis such that the single viewpoint is positioned at a bottom surface of said lens.

20. The apparatus of claim 14, further comprising a top facet positioned at a top edge of said plurality of lens facets, said top facet also directing an image segment to said single viewpoint.

* * * * *